United States Patent [19]

Feigler

[11] Patent Number: 5,284,233
[45] Date of Patent: Feb. 8, 1994

[54] CLUTCH RELEASE BEARING FOR A CLUTCH OF THE PULL-OFF TYPE, ESPECIALLY FOR MOTOR VEHICLES

[75] Inventor: Jacques Feigler, St. Brice S/Foret, France

[73] Assignee: Valeo, Paris, France

[21] Appl. No.: 944,659

[22] Filed: Sep. 14, 1992

[30] Foreign Application Priority Data

Sep. 17, 1991 [FR] France ............................ 91 11444

[51] Int. Cl.⁵ ............................................. F16D 23/14
[52] U.S. Cl. .................................. 192/98; 192/110 B; 192/89 PL
[58] Field of Search ................. 192/98, 89 B, 70.13, 192/110 B, DIG. 1, 89 PL

[56] References Cited

U.S. PATENT DOCUMENTS

| | | | |
|---|---|---|---|
| 4,228,882 | 10/1980 | Huber | 192/98 |
| 4,405,041 | 9/1983 | Broadbent | 192/98 |
| 5,113,989 | 5/1992 | Feigler | 192/98 |

FOREIGN PATENT DOCUMENTS

| | | |
|---|---|---|
| 1467848 | 12/1966 | France . |
| 2304826 | 10/1976 | France . |
| 2350505 | 12/1977 | France . |
| 2653195 | 4/1991 | France . |
| 9113477 | 5/1993 | France . |

*Primary Examiner*—Richard M. Lorence
*Attorney, Agent, or Firm*—Longacre & White

[57] ABSTRACT

A motor vehicle includes a primary unit and a secondary unit, i.e. the engine and gearbox respectively. The clutch release bearing includes a sliding manoeuvring element carried by the secondary unit and carrying a ball bearing, the outer ring of which carries a housing which is so conformed as to define the actuating element of the clutch release bearing that engages with the clutch diaphragm, typically through a standard main coupling member carried by the diaphragm. The actuating element is formed with an engagement recess in which is fitted an intermediate coupling member coupling the actuating element to the main coupling member, while the manoeuvring element of the clutch release bearing is of generally tubular shape.

11 Claims, 3 Drawing Sheets

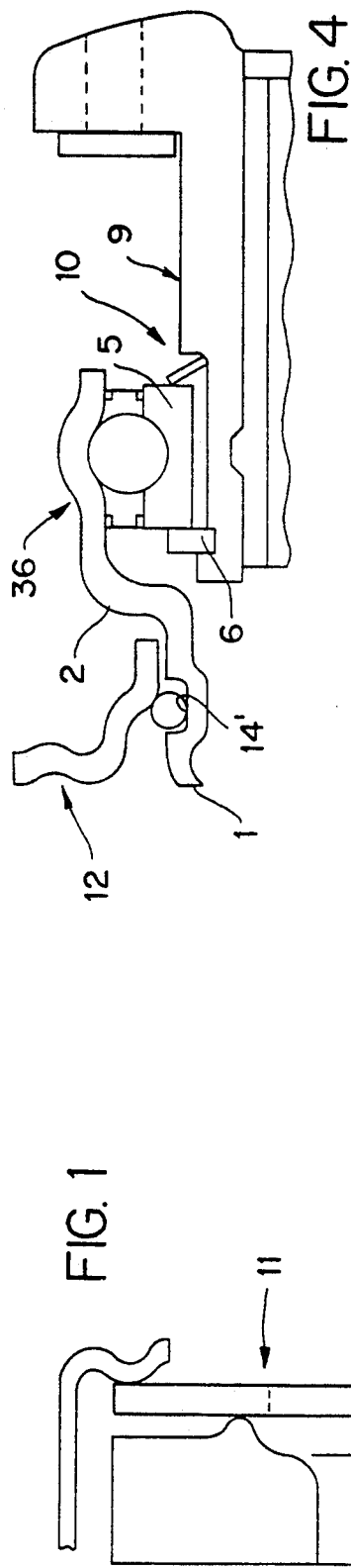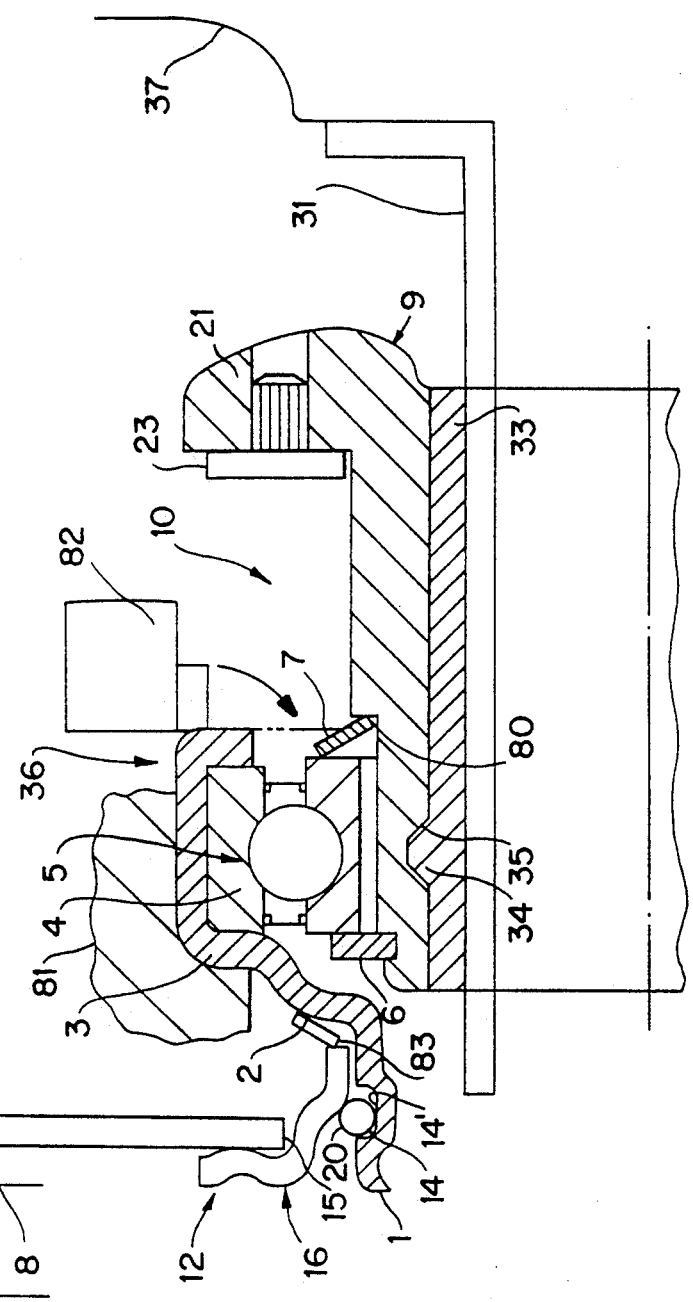

CLUTCH RELEASE BEARING FOR A CLUTCH OF THE PULL-OFF TYPE, ESPECIALLY FOR MOTOR VEHICLES

FIELD OF THE INVENTION

The present invention relates to clutch release bearings for clutches of the pull-off type, especially though not exclusively for motor vehicles, of the general kind disclosed in the specification of U.S. Pat. No. 4,405,041.

BACKGROUND OF THE INVENTION

In the above mentioned United States patent specification, the clutch release bearing includes a manoeuvring element which is subjected to the action of a declutching fork. The bearing also includes a housing and an actuating element which is part of the housing, for acting on the fingers of a clutch diaphragm. The housing is carried on the ends of the clutch diaphragm fingers, by means of a coupling member. The actuating element of the housing is in the form of a sleeve which passes through the diaphragm. The clutch release bearing also includes a ball bearing which is fixed to the housing and which has an outer ring and an inner ring in the usual way. It is the outer ring that is fixed to the housing, the inner ring of the ball bearing being so conformed that it can be coupled disconnectably to the declutching fork through the manoeuvring element of the clutch release bearing. The manoeuvring element is movable in straight line movement along a guide tube.

This manoeuvring element includes pivoting hooking fingers. There is thus provided a clutch release bearing assembly in which the clutch release bearing is provided with a casing which is part of a primary unit of an associated apparatus such as a motor vehicle (the primary unit being for example the engine of the vehicle), in which the said primary unit includes the clutch, with the manoeuvring element of the clutch release bearing being part of a secondary unit of the same apparatus. This secondary unit typically comprises the gearbox of the vehicle, with its input shaft.

One consequence of the form of construction just described is that the ball bearing and the manoeuvring element are comparatively complicated, while the hooking fingers are liable to perturb the sliding movement of the manoeuvring element along its guide tube. In addition, since the clutch release bearing is largely carried by the clutch release mechanism, it is necessary, during assembly of the clutch release bearing by snap-fitting, to perform a large relative movement of the secondary unit of the apparatus with respect to its primary unit, in order to enable the input shaft of the gearbox to be inserted. In addition, before assembly, both the ball bearing and its housing are liable to be damaged as a result of mis-handling.

DISCUSSION OF THE INVENTION

An object of the present invention is to overcome the above drawbacks in a simple and inexpensive manner, while retaining the benefits of a snap-fitting mounting of a clutch release bearing having a housing as defined above.

According to the invention, a clutch release bearing of the kind described above, in which locating means are arranged between the ball bearing and the manoeuvring element in order to provide axial location for the inner ring of the said bearing on the manoeuvring element, and in order to provide axial coupling between the said bearing and the said manoeuvring element (going from the actuating element to the manoeuvring element), is characterised in that, in combination:

(a) the housing, the ball bearing and the manoeuvring element of the clutch release bearing are part of the secondary unit;

(b) the housing of the clutch release bearing is so conformed as to define an actuating element which is provided with an engagement recess for receiving a resiliently deformable coupling member carried by a main coupling member; and (c) the manoeuvring element is of generally tubular shape.

A clutch release bearing constructed in this way is inexpensive, due in particular to the fact that its ball bearings can be of the standard type, while the sleeve that constitutes the manoeuvring element is of simplified form. The main coupling member is also simple and does not itself have a ball bearing.

It will be appreciated that the radial size of the ball bearing of the clutch release bearing can be reduced, the manoeuvring element being smaller radially than the hooking fingers provided in clutch release bearings of the prior art.

In a modified version of a clutch release bearing in accordance with the present invention, further economy can be obtained by arranging that the housing itself constitutes the outer ring of the ball bearing. In that case, the radial size of the clutch release bearing can be reduced even more.

In addition, the amount of movement which has to be performed to bring the primary and secondary units of the apparatus together, and to produce a complete assembly by simple snap-fitting of the clutch release bearing to its main coupling member, is substantially reduced.

The invention removes the need to provide pivoting fingers on the manoeuvring element, and, since the clutch release bearing is not attached by hooking engagement to the clutch release mechanism, the latter no longer runs any risk of being damaged as a result of mis-handling of the clutch before the clutch release bearing is fitted.

In addition, the housing is lighter, and can be mounted on a standard type of main coupling member. Such a housing is preferably made of pressed sheet metal, and can also be the component which is engaged by the declutching fork during assembly of the clutch release bearing assembly.

The inner ring of the ball bearing is simplified, and it is also possible to construct the clutch release bearing so that it is of an automatically centring type, with the locating means then including a resilient element which bears on the manoeuvring element in order to bias the inner ring of the ball bearing towards a shoulder carried by the manoeuvring element, with a radial clearance being provided between the inner ring of the ball bearing and the manoeuvring element.

The manoeuvring element may be provided with an internal sliding ring or low friction liner, to facilitate its movement along a guide which is fixed with respect to the secondary unit of the apparatus.

The description of preferred embodiments of the invention, given below, is by way of example only and with reference to the accompanying drawings.

BRIEF DESCRIPTION OF THE DRAWINGS

FIG. 1 is a half view in axial cross section of a clutch release bearing in accordance with the present invention.

FIG. 4 is a view similar to FIG. 1, but shows the clutch release bearing in a modified embodiment of the invention.

DESCRIPTION OF PREFERRED EMBODIMENTS OF THE INVENTION

Figure 2:
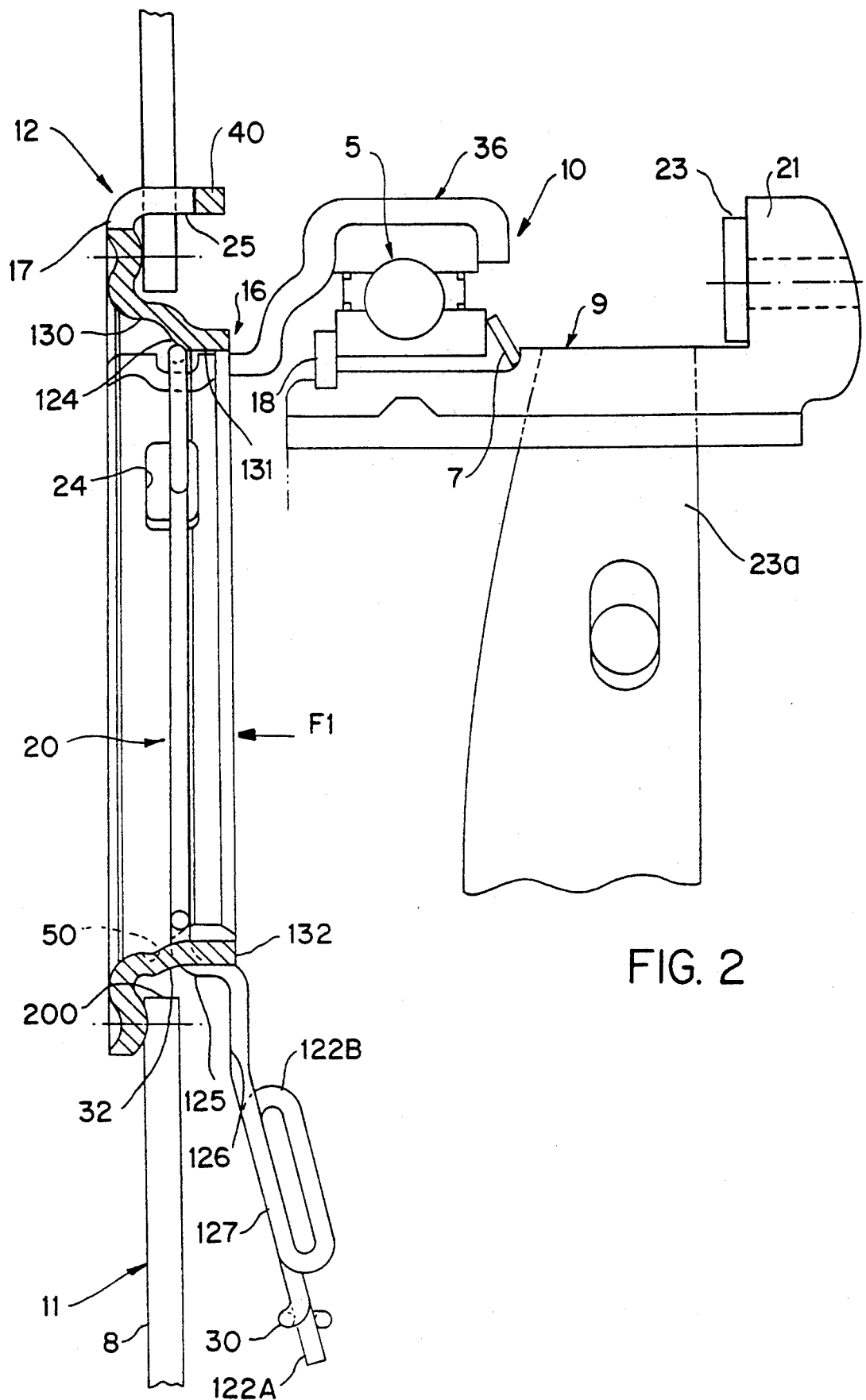
FIG. 2 is an end view of the coupling member, showing part of the clutch release bearing in broken lines.

In FIG. 1, a coupling assembly is shown diagrammatically at 12. This coupling assembly is part of a primary unit which includes a clutch of the pull-off type. The coupling assembly 12 includes a main coupling member 16 which is suitably carried on a declutching device 11 which is part of the clutch. A secondary unit, which includes a gearbox, includes a clutch release bearing 10. The clutch release bearing 10 and the main coupling member 16 are both of annular shape.

It will be recalled, in particular as is disclosed in the specification of U.S. Pat. No. 4,405,041 mentioned above, that a clutch of the pull-off type includes an assembly of annular components, namely a clutch friction wheel, a reaction plate, a pressure plate, a hollow cover plate, and axially acting resilient means. In FIG. 1 of the present specification, the pressure plate and hollow cover plate are indicated diagrammatically, and the axially acting resilient means comprise a diaphragm 11 (constituting the above mentioned declutching device). The diaphragm 11 has a peripheral portion defining a Belleville ring which is joined to a central portion, which is divided into radial fingers 8 separated by slots.

The fingers 8 of the diaphragm form part of the declutching mechanism for the clutch. In a modification, the resilient means mentioned above may consist of a plurality of coil springs which are actuated by declutching levers, the latter being themselves part of the declutching mechanism of the clutch.

The diaphragm 11 bears on the cover plate of the clutch in order to bias the pressure plate towards the reaction plate, so as to grip the friction liners, which form part of the clutch friction wheel in the usual way, between the pressure plate and reaction plate. In order to disengage the clutch a tractive force is exerted on the radially inner ends of the fingers of the diaphragm 11, so as to cause the latter to tilt, thus releasing the gripping force exerted on the pressure plate, and hence also releasing the clutch friction wheel.

This disengaging operation on the clutch is carried out by means of a clutch release bearing assembly. The clutch release bearing assembly includes the clutch release bearing 10 and the main coupling member 16, which here forms part of the coupling between the clutch release bearing 10 and the declutching device (i.e. the diaphragm) 11 of the clutch. The main coupling member 16 is in fact suitably carried on the diaphragm 11. The clutch release bearing 10 includes an actuating element 1, and in this example the clutch release bearing also includes tractive coupling means arranged operatively between the main coupling member 16 and the actuating element 1. These tractive coupling means are arranged to provide axial coupling between the main coupling member 16 and the actuating element 1 (going from the declutching device 11 to the clutch release bearing 10).

The tractive coupling means comprise an intermediate coupling member 20 and a drive surface 14 of the clutch release bearing 10. The intermediate coupling member 20 is resiliently deformable in the radial direction, and in the free state it is at least partially engaged in an annular recess or radially enlarged portion 130 which is formed for this purpose in the main coupling member 16. The resilient intermediate coupling member 20 projects radially in alignment with the main coupling member 16, as can be seen in FIG. 1. The drive surface 14 is formed in an engagement recess 141 which is formed on the actuating element 1, and the intermediate coupling member 20 cooperates axially with the drive surface 14 by bearing against it in the appropriate axial direction.

In order to assemble the clutch release bearing assembly, it is necessary to bring the primary and secondary units mentioned above towards each other (i.e. to offer up the engine of the vehicle to the gearbox or vice versa), so that the input shaft of the gearbox will penetrate into the main coupling member 16. This movement is continued until the main coupling member 16 and the clutch release bearing 10 are in snap-fit engagement with each other in a manner to be described below, by virtue of the intermediate coupling member 20 cooperating with the engagement recess 14', the annular recess 130, and the drive surface 14.

In this example, the clutch release bearing 10 includes a hollow, annular housing 36, a ball bearing 5, and a manoeuvring element 9 which is arranged to be actuated by a suitable control member, such as a declutching fork on a piston of a hydraulic control unit. The housing 36 includes the actuating element 1, and is fixed with respect to the rotating outer ring of the ball bearing 5. The manoeuvring element 9 is arranged to slide along a guide tube 31 which is fixed to the casing of the gearbox (which is indicated diagrammatically at 37), and which is therefore a fixed part of the secondary unit of the vehicle.

The clutch release bearing 10 is characterised by the following features in combination:

(a) the housing 36, the ball bearing 5 and the manoeuvring element 9 of the clutch release bearing are part of the secondary unit of the vehicle;

(b) the housing 36 of the clutch release bearing 10 is formed so as to include the actuating element 1, having the engagement recess 14' for receiving the radially resiliently deformable intermediate coupling member 20 carried by the main coupling member 16 (and therefore by the primary unit of the vehicle); and (c) the manoeuvring element 9 is of generally tubular shape.

In FIG. 1, the ball bearing 5 is of a standard type. Locating means 6, 7, 80 are provided between the ball bearing 5 and the manoeuvring element 9, in order to locate the non-rotating inner ring of the ball bearing 5 axially on the tubular manoeuvring element 9, and in order also to provide axial coupling between the ball bearing 1 and the manoeuvring element 9, considered in the direction going from the actuating element to the manoeuvring element.

In this example the housing 36 is of pressed sheet steel, and is generally annular in shape. It includes a skirt portion 4 which is oriented generally in the axial direction and which surrounds, without a clearance, the outer ring of the ball bearing 5. The skirt portion 4 is extended at one end by an upset portion 3 which is directed radially inwardly towards the axis of the assembly. The upset portion 3 is itself extended, again radially inwardly towards the axis of the assembly, by a junction portion 2 of the housing 36 which is sinuous in cross sectional shape as shown in FIG. 1 and generally inclined to the radial direction. The junction portion 2 is joined to a cylindrical portion in the form of an axial spigot, and it is this cylindrical portion that constitutes the actuating element 1.

The actuating element 1 penetrates into the main coupling member 16, and more particularly into the interior of a spigot portion 18 of the latter (see FIGS. 2 and 3), which will be described in more detail below. It is in the spigot 1 that the engagement recess 14' for the intermediate coupling member 20 is formed, and in this example it is formed by pressing, the intermediate coupling member 20 being here in the form of a ring. The engagement recess 14' consists of a groove, one flank of which constitutes the drive surface. The flank 14 is that which is furthest away from the ball bearing 5 and closest to the free end of the spigot 1. The latter is chamfered in order to facilitate penetration of the actuating element 1 into the coupling ring 20, during the assembly operation to be described below.

The other or free end of the skirt portion 4 is made initially in a generally straight form, but is upset radially inwardly as can be seen in FIG. 1, so as to retain the outer ring of the ball bearing 5 between this upset portion (or flange) and the other upset portion, 3, of the housing 36. This enables the thickness of the housing 36 to be reduced. The upset flange defines an engagement surface for the declutching fork mentioned above (referenced as 23a) during the snap-fitting of the clutch release bearing assembly. The outer ring of the ball bearing 5 is therefore secured to the housing 36 by gripping engagement, being trapped in the latter by the upset portion 3, the skirt portion 4 and the terminal flange at the right hand end (as seen in FIG. 1) of the housing 36.

It will be realised that, instead of upsetting the terminal end of the skirt portion in order to form this flange, it is of course possible to locate the outer ring of the ball bearing 5 axially by means of a circlip, as disclosed in the specification of U.S. Pat. No. 4,405,041 mentioned above.

The manoeuvring element 9 of the clutch release bearing is generally in the form of a sleeve, and has at least two lugs 21 extending transversely at one of its ends, for accommodating hardened dowels 23. These dowels act as anvils for engagement with the fingers of the declutching fork 23a in a known manner. The declutching fork 23a may be held in engagement with the lugs 21, for example by springs, in order to enable the clutch release bearing assembly to be assembled together. In this example also, the manoeuvring element is in the form of a casting, and has a sliding surface formed on an internal tubular liner 33 of a suitable anti-friction material, for example a plastics material, to facilitate sliding of the clutch release bearing 10 along the guide tube 31. The liner 33 is secured in the sleeve 9 by force-fitting, and is formed with a radial rib 34 which is engaged in a groove 35, of generally trapezoidal shape, formed in the bore of the sleeve 9, to provide positive axial location of the liner 33 in the sleeve 9.

The outer periphery of the sleeve 9 carries two shoulders 6 and 80, which are offset axially with respect to each other and which form part of the above mentioned locating means for the inner ring of the ball bearing 5. The shoulder 80 is defined by a change in diameter occurring between two sections of the sleeve 9, towards the free end of the sleeve remote from that which carries the lugs 21. The shoulder 6 is formed on a circlip which is fitted in an annular groove formed adjacent to this free end of the sleeve 9. The circlip 6 lies facing the junction portion 2 of the housing 36, leaving a space for fitting the circlip. This enhances the compactness of the clutch release bearing 10.

A groove is thus defined between the shoulder 80 and the circlip 6, and the inner ring of the ball bearing 5 is located in this groove. As mentioned above, the locating means for the inner ring of the ball bearing consists of the circlip 6, shoulder 80, and an element 7 which consists of an axially acting resilient means 7. In this example the latter is a Belleville ring, but it may, in a modification, consist of a resilient corrugated ring. The Belleville ring 7 bears against the shoulder 80 and also against one radial side of the inner ring of the ball bearing 5, thus holding the other radial side of the inner ring in contact with the circlip 6. A radial clearance is defined between the inner ring of the ball bearing 5 and the corresponding cylindrical surface of the sleeve 9, as can be seen in FIG. 1. Under the control of the Belleville ring 7, the ball bearing 5 carrying the housing 36 is thus able to be displaced radially with respect to the manoeuvring element or sleeve 9.

It will therefore be realised that the clutch release bearing 10 has an auto-centring facility, with the bearing 5 being located axially on the manoeuvring element 9. During disengagement of the clutch, the tractive force which is exerted on the lugs 21 is transmitted to the circlip 6 and thence to the ball bearing 5; and from the latter to the actuating element 1, which transmits the force to the coupling assembly 12.

It will be realised that the fastening of the housing 36 to the outer ring of the ball bearing 5 is easy to achieve. FIG. 1 indicates, diagrammatically, two tools 81 and 82 for this purpose. The tool 81 engages against the upset portion 3 and skirt portion 4 of the housing 36, while the tool 82 is provided for the purpose of forming the terminal end flange by upsetting the right hand end, as seen in FIG. 1, of the skirt portion 4.

Referring to FIG. 4, this shows a modified arrangement in which the housing 36 is so formed as itself to constitute the outer ring of the ball bearing. This reduces the radial size of the clutch release bearing 10. The housing 36 then has no upset terminal end flange. Its junction portion 2 enables the circlip 6 to be fitted as before.

As will be evident from the foregoing, the actuating element 1 of the clutch release bearing 10 is adapted to be fitted with a snap-fit on to the coupling assembly 12 which includes the main coupling member 16. The coupling member 16 is formed with a collar portion 17 of generally bent shape, for engagement, at the ends of the fingers 8 of the diaphragm 11, on the surface of the fingers which is directed away from the ball bearing 5. The collar portion 17 is joined to the spigot portion 18 of the coupling member.

Figure 3:
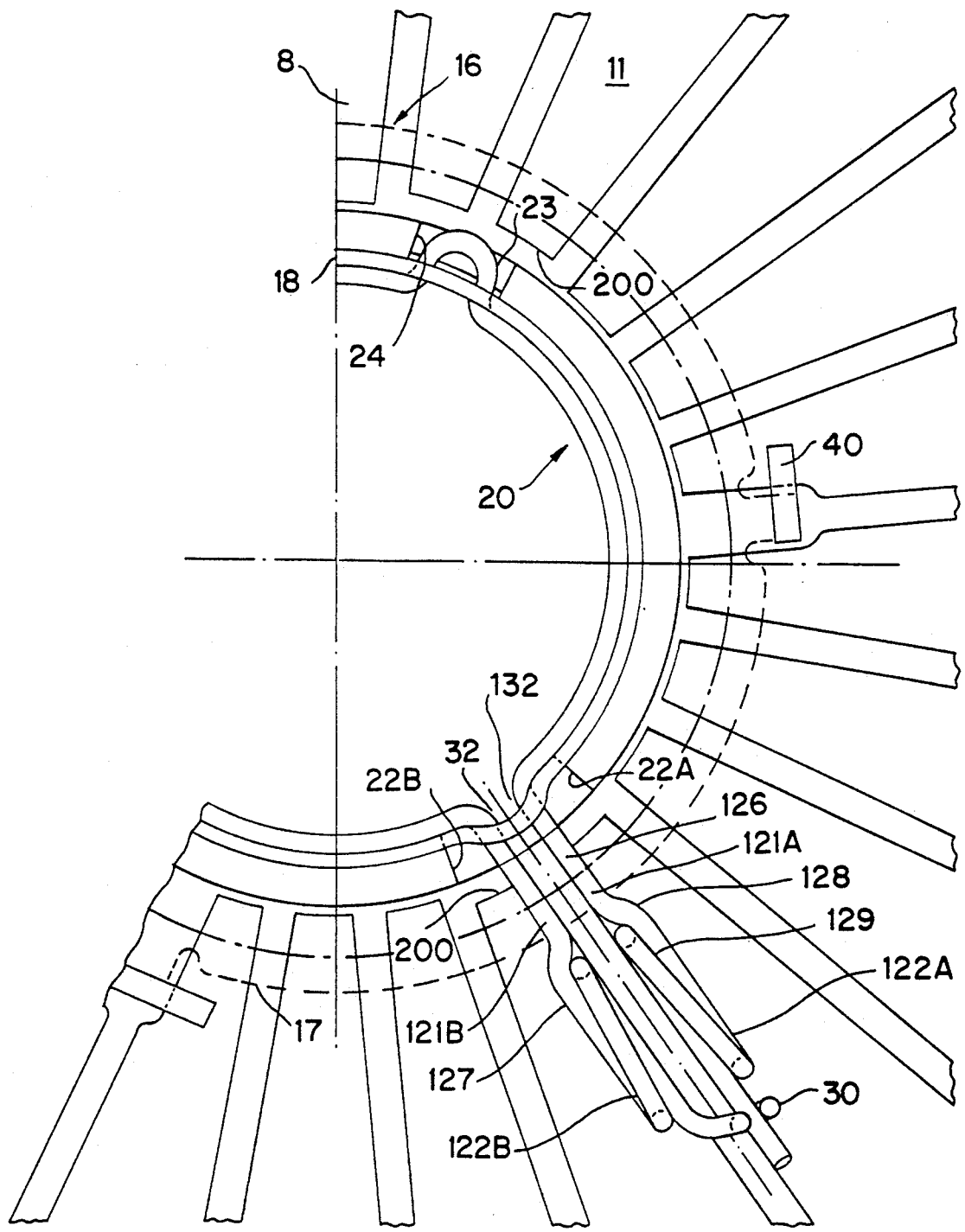
FIG. 3 is a partial view as seen in the direction of the arrow F1 in FIG. 2.

As regards the diaphragm 11, it will be noted that the radial slots separating its radial fingers 8 from each other are shown in FIG. 3. It is the central portion of the diaphragm that has these fingers and slots, and this central portion is formed with a central aperture 15, through which the spigot portion 18 of the main coupling member 16 passes. In this example, the latter is formed of pressed sheet steel.

As shown in FIGS. 2 and 3, given that the coupling assembly 12 is provided so that the clutch release bearing 10 can act in traction on the diaphragm 11 of a clutch, the collar portion 17 of the main coupling member 16 is arranged to locate the coupling assembly 12. To this end, the collar portion 17 is provided with fingers 25, which are spaced apart on its outer periphery. The fingers 25 are directed axially in the same direction as the spigot portion 18 of the main coupling member 16. The fingers 25 pass through the diaphragm 11, with each finger passing through a respective one of the radial slots that separate the fingers 8 of the diaphragm. Each finger 25 carries a cantilevered retaining portion 40 extending generally circumferentially and generally parallel to the collar portion 17 itself. These retaining portions 40 cooperate with the collar portion 17, so as to retain the assembly axially on the diaphragm 11.

In a modification, the ends of the fingers 25 may be formed with a groove in which a Belleville ring is mounted, with the inner end of this Belleville ring being applied on the fingers 8 of the diaphragm 11. The main coupling member 16 is then carried on the fingers 8 by gripping engagement. However, other suitable arrangements may of course be provided for attaching the main coupling member to the fingers of the diaphragm.

The intermediate coupling ring 20, being resiliently deformable in the radial direction, extends in a plane which substantially at right angles to the axis of the assembly, and is made of round wire. It is of the open type, i.e. discontinuous, its two ends being formed with respective arms 121A and 121B. Each of these arms passes through the spigot portion 18 of the main coupling member 16, via two distinct openings 22A and 22B respectively of the latter, so that the arms 121A and 121B extend outside the spigot portion 18.

That part of the spigot portion 18 that includes the openings 22A and 22B, through which the arms 121A and 121B pass, is at least partly deformed radially in a direction away from the axis of the assembly so as to define a curved portion 132, which is concave towards the axis of the assembly. The openings 22A and 22B are separated by a bridge portion 32 which is deformed locally in the radial direction away from the axis of the assembly. the bridge portion 32 being formed partly with an inwardly curved shape.

It will be seen in FIG. 2 that the spigot portion 18 is formed with a frusto conical section 124 having a frusto-conical internal surface, and two cylindrical portions 130 and 131 which extend on either side of the frusto-conical portion 124. It is of course the cylindrical portion 130 that is the radially enlarged portion, defining an annular recess, mentioned earlier. It is of enlarged diameter and is joined to the collar portion 17 through a bend, while the other cylindrical portion 131, which is formed at the free end of the spigot portion 18, is chamfered internally and has a smaller diameter. The local curved portion 132 is formed partly on the bridge portion 32 and on the whole of the cylindrical portion 131 in axial alignment with the bridge portion 32.

Reverting to the intermediate coupling ring 20, this has at least one supplementary lug 23, extending radially and engaging in an aperture 24 formed in the spigot portion 18 of the coupling member 16. The axial width of the aperture 24 is greater than that of the supplementary lug 23. In this example there are two radial supplementary lugs 23, each of which consists of a generally U-shaped radially outward deformation of the wire of the coupling ring 20. Accordingly, two apertures 24 are provided, each of which is located generally at 120 degrees from the openings 22A and 22B. The supplementary lugs 23 are in contact with only one of the lateral or circumferential edges of the apertures 24, so as to enable the coupling ring 20 to expand during the snap-fitting of the clutch release bearing 10.

In order to improve the elasticity of the open coupling 20, its two arms 121A and 121B are each formed with a deformation 122A and 122B which elasticly increase the length of the arms. In this example, each of these deformations 122A and 122B is in the form of a loop. Each of these loops is in the form of a turn of a tension spring; and after fitting, they extend radially outwardly of the clutch release bearing. The loops 122A and 122B reduce the overall rigidity of the coupling ring 20. This facilitates the clip-type fitting of the latter, as well as enhancing its gripping effect.

Outside the spigot portion 18 of the main coupling member 16, and beyond the loops 122A and 122B, the arms 121A and 121B of the coupling ring 20 are formed with two bends such that their ends, which are offset axially with respect to the main or circular part of the ring 20, lie together in a plane which is parallel to the latter between the clutch release bearing 10 and the diaphragm 11. The end of the arm 121B is formed with an oblique hook 30, whereby it is resiliently hooked on to the straight part of the arm 121A.

Each of the arms 121A, 121B, after passing through the openings 22A and 22B respectively, has an axially oriented portion 125. Prior to the fitting of the clutch release bearing, this axially oriented portion 125 is in contact with the outer surface of the spigot portion 18 of the coupling member 16, and more precisely with its cylindrical portion 131. The axial portions 125 are each extended by a first radial portion 126, which is itself extended by an inclined second radial portion 127, lying in the plane of FIG. 4 and including the corresponding loop 122A or 122B. It will be noted from FIG. 3 that the portions 126 are closer to each other than the portions 127, and enable the diaphragm 11 to tilt. Each first radial portion 126 is joined to the corresponding second radial portion 127 through an S-shaped bend 128, while the portions 126 of the two arms 121A and 121B are parallel to each other, the portions 127 of the two arms being similarly parallel to each other.

Each second radial portion 127 has two radial sections offset axially from each other but parallel to each other, these two sections being joined together by the inclined section 129 of the corresponding loop 122A or 122B. Thus each inclined section 129 generally defines one turn of a helical spring, the loops constituting a spring of the clothes peg type. The loops thus constitute a winding. It will of course be realised that the purpose of the S bends is to provide space for accommodation of the loops.

The diaphragm is relieved as indicated at 200 in FIG. 3, in line with the openings 22A and 22B, in order to facilitate fitting of the intermediate coupling ring 20. In addition, for reasons of symmetry, two further relieved portions are provided in the vicinity of the lugs 23. These relieved portions 200 are formed by shortening the inner periphery of each of the appropriate fingers 8 of the diaphragm.

As a result, during fitting of the clutch release bearing 10. it is ensured that the intermediate coupling ring 20 will come into engagement against the axial base of the openings 22A and 22B, outside the radius of curvature of the coupling ring 20 joining the axial portions 125 to the circular main part of the coupling ring. The relieved portions 200 thus enable the axial portions 125 to be passed through, such that the expansion of the ring 20 caused by the spring loops 122A and 122B takes place satisfactorily by engagement on the axial base of the openings 22A and 22B, while the curved portion 132 enables the ring 20 to be positioned initially.

It should be noted that, in the free configuration of the coupling ring 20, its arms 121A and 121B are spaced away from each other while the diameter of the ring is increased.

For assembly of the clutch release bearing assembly, the gearbox of the vehicle is offered up to its engine block, with the diaphragm 11 already fitted with the coupling assembly 12. During this operation, the intermediate coupling ring 20 is preferably in its free or relaxed state. As the gearbox and engine block are brought together, for example by engagement of the declutching fork on the upset end of the skirt portion 4 of the housing member of the clutch release bearing, the chamfered free end of the actuating element 1 is inserted into the intermediate coupling ring 20 and the spigot portion 18 of the main coupling member 16, thus mounting the clutch release bearing on the ring 20 by snap-fitting without any applied force. The arms 121A and 121B of the ring 20 are subsequently hooked together.

Thus, after the clutch release bearing 10 has been snap-fitted on to the coupling member 20, and after the arms 121A and 121B of the latter have been resiliently hooked together, the said arms are caused to bear circumferentially and laterally on the bridge portion 32. The ring 20 is constricted between the engagement surface 14 of the actuating element 1 and the frusto-conical portion 124 of the main coupling member 16. The declutching forces are thus transmitted through the intermediate coupling member 20. For dismantling, the arms 121A and 121B merely need to be unhooked from each other, so that the ring 20 passes from its closed or compressed position to its free or relaxed position.

The present invention is of course not limited to the embodiments described above. In particular, in place of the lugs 21, the manoeuvring element or sleeve 9 of the clutch release bearing may be formed with a transverse collar, and be subjected for example to the action of at least one movable piston of a piston and cylinder actuator defining a control chamber for controlling the relative movement between its components. The cylinder is fixed, and the piston, in this case, constitutes the control means which, like the declutching fork, manoeuvres the sleeve 9 and displaces the latter along the guide tube 31 so as to provide the tractive force for disengaging the clutch.

In place of a circlip, any other means defining the shoulder 6 may of course be provided. For example, this shoulder may be formed directly on the sleeve 9 by an upsetting operation.

The shoulder 80 may be formed on a circlip in the same way as that formed on the circlip 6, so that the provision of two cylindrical portions of the sleeve 9 of different diameters, defining a shoulder at their junction, is optional.

In every case, the junction portion 2 of the housing 36 defines an axial offset between the rolling bearing 5 and the actuating element 1, to enable the means (such as the circlip shown) defining the shoulder 6 to be fitted and located.

When the forces to be transmitted are less in magnitude, the sleeve 9 may be made of pressed sheet steel instead of being in the form of a casting. The axial coupling between the sleeve 9 and rolling bearing 5 may be of a type which does not have an automatic centring facility. In that case, the rolling bearing is mounted without clearance on the sleeve, and is held axially in a fixed position between the shoulders 6 and 80.

In all cases the clutch release bearing is fitted blind, by simple snap-fitting action, on to an actuating element which is simplified by virtue of its engagement recess, and is itself inexpensive. In this connection the housing of the clutch release bearing, being of pressed sheet metal and light in weight, is fixed with respect to the outer ring of a standard ball bearing, the inner ring of which is applied axially to a shouldered sleeve which may have a sleeve liner, to facilitate sliding movement of the clutch release bearing.

It will be appreciated that the engagement groove 14' can easily be made by pressing in all cases.

Similarly, it is possible to use the junction portion 2 of the housing 36 so as to interpose between the latter and the free end of the spigot portion 18 of the main coupling member an axially acting resilient ring, for example a Belleville ring 83, which is indicated in broken lines in FIG. 1. The intermediate coupling ring 20 is thus continuously restrained between the drive surface 14 and the frusto-conical surface 124. The operation of fitting the clutch release bearing is then substantially foolproof.

The main coupling element may be made to be quite heavy, and to carry an internal ring of an open kind which is resiliently deformable in the radial direction, this ring being engaged in a radially enlarged groove formed in the bore of the main coupling member, and being arranged to penetrate into the engagement recess 14' of the actuating element 1.

As is disclosed in FIGS. 1 and 4 of the specification of French patent application No. 91 13477, the manoeuvring element of the clutch release bearing may consist of the piston of a hydraulic control actuator. In that case, the back end of the manoeuvring element comprises a radial dorsal flange directed inwardly, and is mounted for sliding movement of a cylinder, the front end of which is formed with a front flange which is also directed inwardly. A control chamber is thus defined between the dorsal and front flanges, with sealing rings being fitted in the flanges and a suitable supply for fluid under pressure being fitted in the manoeuvring element for supply of such fluid to the control chamber.

A removable wedge may be fitted between the dorsal or rear end of the manoeuvring element and the gearbox casing, in order to maintain the piston in a retracted position and so facilitate assembly of the main coupling member to the clutch release bearing.

In all cases, the manoeuvring element of the clutch release bearing is generally of tubular shape, and has a flange extending radially either outwardly or inwardly.

What is claimed is:

1. A clutch release bearing for an apparatus comprising a primary drive unit, a transmission unit, a clutch means of the pull-off type for releasably transmitting drive from the primary drive unit to the transmission unit, and a clutch control means for controlling an operation of said clutch means, said clutch release bearing comprising:

a coupling assembly engaging said clutch means, said coupling assembly comprising a main coupling means for coupling said clutch release bearing to a declutching member of said clutch means, and a resilient intermediate coupling member carried by said main coupling means;

a manoeuvring element operatively connected to and adapted to be moved by said clutch control means;

a bearing means carried by said manoeuvring element for facilitating movement of said manoeuvring element with respect to said coupling assembly, said bearing means including an outer ring member and an inner ring member;

a housing member coupled to said outer ring member of said bearing means;

an actuating element carried by said housing member and adapted to be coupled to said coupling assembly; and locating means positioned between the inner ring of said bearing means and said manoeuvring element for axially locating the bearing means with respect to said manoeuvring element and for axially coupling said bearing means to said manoeuvring element, wherein said actuating element is integrally formed with said housing and defines an engagement recess for receiving said intermediate coupling member.

2. A clutch release bearing according to claim 1, wherein the manoeuvring element comprises a sleeve defining two shoulders offset axially from each other, with the inner ring of the bearing means being mounted between the two shoulders.

3. A clutch release bearing according to claim 2, wherein said sleeve has two portions of different diameters jointed by a first of said shoulder.

4. A clutch release bearing according to claim 3, wherein said locating means comprise an axially acting resilient means bearing on said first shoulder so as to bias the inner ring of the ball bearing towards the second of said shoulders, said inner ring defining a radial clearance between itself and the sleeve.

5. A clutch release bearing according to claim 1, wherein the housing further includes a skirt portion having a radially deformed first end and an upset portion joining the junction portion to the skirt portion, the outer ring of the ball bearing secured by gripping between the said upset portion and the radially deformed first end of the skirt portion.

6. The clutch release bearing according to claim 5, wherein the bearing means further comprises a ball bearing.

7. The clutch release bearing recited in claim 1, wherein said manoeuvring element is generally tubular in shape.

8. A clutch release bearing for an apparatus comprising a primary drive unit, a transmission unit, a clutch means of the pull-off type for releasably transmitting drive from the primary drive unit to the transmission unit, and a clutch control means for controlling an operation of said clutch means, said clutch release bearing comprising:

a coupling assembly engaging said clutch means, said coupling assembly comprising a main coupling means for coupling said clutch release bearing to a declutching member of said clutch means, and a resilient intermediate coupling member carried by said main coupling means;

a manoeuvring element operatively connected to and adapted to be moved by said clutch control means, said manoeuvring element comprises a sleeve defining two shoulders offset axially from each other;

a bearing means carried by said manoeuvring element for facilitating movement of said manoeuvring element with respect to said coupling assembly, said bearing means including an outer ring member and an inner ring member, the inner ring member of said bearing means being mounted between the two shoulders of the manoeuvring element;

a housing member coupled to said outer ring member of said bearing means;

an actuating element carried by said housing member and adapted to be coupled to said coupling assembly; and locating means positioned between the inner ring of said bearing means and said manoeuvring element for axially locating the bearing means with respect to said manoeuvring element and for axially coupling said bearing means to said manoeuvring element, wherein the housing includes a junction portion of sinuous shape defining a space for accommodating one of said shoulders of the manoeuvring sleeve within said space, said actuating element comprising a sleeve portion of the housing joined to said junction portion.

9. The clutch release bearing recited in claim 8, wherein an axially acting resilient ring is interposed between said junction portion of the housing and a free end of said main coupling means.

10. The clutch release bearing recited in claim 8, wherein said junction portion is generally inclined to the radial direction.

11. A clutch release bearing for an apparatus comprising a primary drive unit, a transmission unit, a clutch means of the pull-off type for releasably transmitting drive from the primary drive unit to the transmission unit, and a clutch control means for controlling an operation of said clutch means, said clutch release bearing comprising:

a coupling assembly engaging said clutch means, said coupling assembly comprising a main coupling means for coupling said clutch release bearing to a declutching member of said clutch means, and a resilient intermediate coupling member carried by said main coupling means;

a manoeuvring element operatively connected to and adapted to be moved by said clutch control means;

a bearing means carried by said manoeuvring element for facilitating movement of said manoeuvring element with respect to said coupling assembly, said bearing means including an inner ring member and a housing member defining an outer ring member;

an actuating element carried by said housing member and adapted to be coupled to said coupling assembly; and locating means positioned between the inner ring of said bearing means and said manoeuvring element for axially locating the bearing means with respect to said manoeuvring element and for axially coupling said bearing means to said manoeuvring element.

* * * * *